United States Patent
Holley

(10) Patent No.: US 6,174,578 B1
(45) Date of Patent: Jan. 16, 2001

(54) RADIATION DEACTIVATABLE ADHESIVE TAPE

(75) Inventor: Leonard E. Holley, Walkertown, NC (US)

(73) Assignee: Rexam Industries Corp., Charlotte, NC (US)

( * ) Notice: Under 35 U.S.C. 154(b), the term of this patent shall be extended for 0 days.

(21) Appl. No.: 08/957,500

(22) Filed: Oct. 24, 1997

(51) Int. Cl.⁷ ................ B32B 33/00; B32B 9/00
(52) U.S. Cl. .......... 428/40.1; 428/40.9; 428/41.5; 428/41.7; 428/41.8; 428/343; 428/354; 428/355 R; 428/461; 428/446; 428/450; 156/275.6; 156/275.7; 156/307.7; 264/241; 264/603
(58) Field of Search .............. 428/40.1, 40.9, 428/41.5, 41.8, 41.9, 343, 355, 41.7, 354, 426, 480, 457, 458, 461, 472, 446, 447, 448, 450; 156/275.6, 275.7, 307.7; 264/241, 603

(56) References Cited

U.S. PATENT DOCUMENTS

| | | | |
|---|---|---|---|
| 3,991,149 | 11/1976 | Hurwitt | 264/63 |
| 4,246,297 | 1/1981 | Nablo et al. | 427/44 |
| 4,640,967 | * 2/1987 | Eckberg | 528/26 |
| 4,641,221 | 2/1987 | Khoury et al. | 361/321 |
| 4,752,857 | 6/1988 | Khoury et al. | 361/321 |
| 4,999,242 | * 3/1991 | Ishiwata et al. | 428/345 |
| 5,133,804 | * 7/1992 | Culpon, Jr. | 106/38.24 |
| 5,164,245 | * 11/1992 | Suzuki | 428/201 |
| 5,278,199 | * 1/1994 | Ohkawa et al. | 522/95 |
| 5,481,428 | 1/1996 | Lauf et al. | 361/305 |
| 5,502,085 | * 3/1996 | Ohura et al. | 522/106 |
| 5,519,087 | 5/1996 | Tang | 524/779 |
| 5,538,771 | * 7/1996 | Nakayama et al. | 428/41.3 |
| 5,603,147 | 2/1997 | Bischoff et al. | 29/25.42 |
| 5,603,793 | * 2/1997 | Yoshida et al. | 156/247 |
| 5,686,504 | * 11/1997 | Ang | 522/46 |

* cited by examiner

Primary Examiner—Ellis Robinson
Assistant Examiner—John J. Figueroa
(74) Attorney, Agent, or Firm—Alston & Bird LLP

(57) ABSTRACT

An adhesive tape is disclosed that is useful in the manufacture of ceramic articles, and particularly ceramic electronic components such as capacitors. The tape can be used to adhere a green ceramic article to a rigid surface for handling during the manufacturing operation. The adhesive can be deactivated after the green ceramic article has been laminated and diced to release the laminated and diced ceramic articles. The adhesive tape comprises a substrate; a light-reflective metallic layer on the substrate; a first adhesive layer of a heat stable adhesive composition on one surface of the substrate, and a second adhesive layer on the opposite surface of the substrate. The second adhesive layer comprises a heat stable, radiation curable adhesive composition which loses its adhesive characteristics upon exposure to radiation.

23 Claims, 1 Drawing Sheet

RADIATION DEACTIVATABLE ADHESIVE TAPE

FIELD OF THE INVENTION

The invention relates to an adhesive tape useful in the manufacture of ceramic articles, and particularly ceramic electronic components such as capacitors.

BACKGROUND OF THE INVENTION

Certain types of ceramic capacitors are manufactured by laying up multiple thin layers of a ceramic insulator material alternating with thin electrically conductive layers. The conductive layer may, for example, take the form of a pattern screen printed with a conductive ink composition. The ceramic insulator layer is typically composed of inorganic and organic materials in an unfired or "green" form. The layered conductor/insulator structure is then heated fire or sinter the ceramic composition and the alternating layered conductor/insulator structure fuses into a monolithic article.

To facilitate handling during the manufacturing operation, an adhesive tape has been used to adhere a first green ceramic layer to a rigid carrier such as a metal plate. Then, alternating conductive layers and green ceramic insulating layers are stacked upon the first ceramic layer, and the layered structure is pressed and consolidated. Subsequently, the layered structure may be cut or diced to form individual discrete capacitors. Thereafter, the layered structures are fired or sintered to harden the ceramic and unite the layered structure.

In the manufacturing process, the adhesive tape is relied upon to firmly hold the layered structure to the carrier during the various processing steps of laying up, printing, dicing, etc. Before the ceramic articles have been fired however, they must be removed from the carrier without damage.

Conventional adhesive tapes used heretofore for this purpose have typically employed a heat curable adhesive. The adhesive loses its adhesive characteristic when heated under certain time and temperature conditions, thus allowing for release of the ceramic material from the adhesive tape. However, with this type of tape, the temperatures which can be used during the laminating or drying operations are limited by the properties of the tape. Laminating the ceramic layers at higher temperatures would better adhere the layers to one another. However, these higher temperatures that would help the ceramic layers adhere to one another can also cause the adhesive tape to prematurely release the ceramic articles from the carrier. Also, the time required to effect deactivation of the adhesive and release of the ceramic articles by heating is a limitation upon manufacturing throughput.

It is an object of the present invention to overcome the limitations of the prior conventional adhesive tapes just described. More particularly, it is an object of the present invention to provide an adhesive tape which can be used at higher temperatures than heretofore without allowing the tape to prematurely release from the carrier.

SUMMARY OF THE INVENTION

The present invention provides an adhesive Tape which is capable of withstanding high temperatures and wherein its adhesive characteristics can be deactivated by exposure to actinic radiation, such as ultraviolet light. Broadly, an adhesive tape in accordance with the present invention comprises a substrate and a first adhesive layer on one surface of the substrate. This adhesive layer comprises a heat stable adhesive composition. A second adhesive layer is provided on the opposite surface of the substrate, with this second adhesive layer comprising a heat stable radiation curable adhesive composition which loses its adhesive characteristics upon exposure to radiation. The tape is adhered to a rigid carrier by the first adhesive layer, and a green ceramic article is adhered to the second adhesive layer. The adhesive tape firmly holds the ceramic layer in place on the carrier during the manufacturing operation. After dicing of the ceramic article, when it is desired to release the ceramic articles from the carrier, the second adhesive layer may be exposed to radiation, thereby causing the adhesive properties of the second adhesive to be deactivated and allowing for release o the ceramic articles.

In one embodiment of the invention, the adhesive tape employs a substrate formed of a heat stable polyester film having a reflective metallized coating on one surface thereof. On one surface of the film substrate, there is provided a first adhesive layer of a heat stable pressure sensitive acrylic adhesive composition. This adhesive layer is intend for adhering the tape to a rigid carrier, such as a metal plate. On the opposite surface of the polyester film substrate, a second adhesive layer is provided. This second adhesive layer comprises a heat stable, radiation curable acrylic pressure sensitive adhesive composition in which the pressure sensitive adhesive characteristics are deactivated upon exposure to radiation. Preferably, this second adhesive layer has dispersed in it a finely divided particulate filler which serves for scattering light and thus facilitates distributing ultraviolet light throughout the second adhesive layer when the tape is exposed to ultraviolet light for curing. This makes it possible to cure the second adhesive by exposing ultraviolet light to the tape from the top side, i.e. the side to which the ceramic articles are adhered. Preferably, the ceramic articles are adhered to the tape with marginal edges of the tape protruding beyond the perimeter of the ceramic article. When exposed to ultraviolet radiation these protruding marginal edge portions, coupled with the presence of the light dispersing filler, allows the radiation to be dispersed laterally throughout the second adhesive layer to achieve deactivation of the adhesive.

BRIEF DESCRIPTION OF THE DRAWINGS

Other embodiments of the invention, as well as additional features and advantages, will become apparent from the detailed description which follows, and from the accompanying drawings, in which.

DESCRIPTION OF ILLUSTRATED EMBODIMENTS

Figure 1:
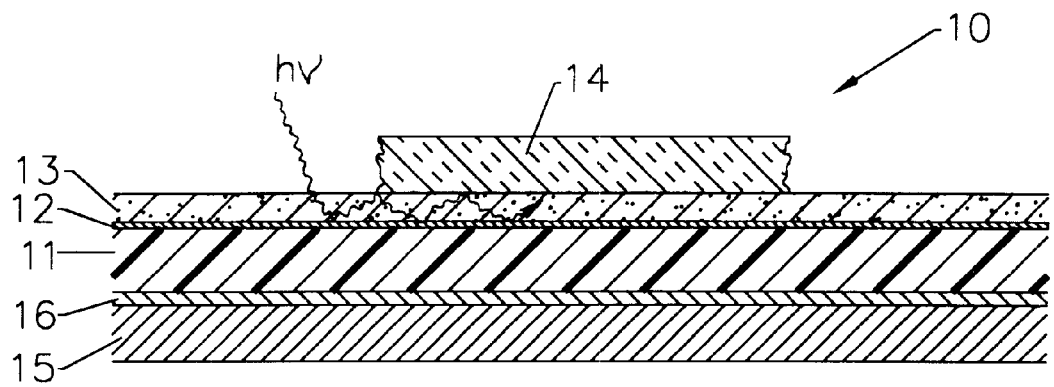
FIG.1 is a cross-sectional view of a first embodiment of an adhesive tape in accordance with the present invention.

In FIG. 1, an adhesive tape is broadly indicated by the reference character 10. The tape comprises a substrate 11, which is formed of a heat stable sheet material. By heat stable, it is meant that the sheet material does not significantly deteriorate or lose its strength or handling properties upon exposure to the ambient and elevated temperature conditions normally encountered in processing of green ceramic insulator materials. Furthermore, the sheet material is dimensionally stable under such elevated temperature conditions. One readily available material meeting these characteristics is polyester film, preferably a heat set biaxially oriented polyethylene terephthalate (PET) film. Such films are available commercially from various sources, examples of which include MYLAR 500D, from Dupont and Hostaphan from 3900 from Hoechst Diafoil.

In the embodiment illustrated, the polyester film has a light reflective layer 12 on one surface which may, for example, comprise an aluminum foil layer adhered to the film substrate 11 or a vacuum metallized aluminum coating. Polyester films with vacuum metallized aluminum coatings are generally widely available and familiar to those of ordinary skill in this art. An adhesive layer 13 of a heat stable, radiation curable adhesive composition is provided on the reflective layer 12. On the opposite surface of the substrate, another heat stable adhesive layer 16 is provided. As shown, the adhesive layer 16 adheres the tape 10 to a carrier 15, which may for example comprise a rigid metal sheet. As shown in FIG. 1, a green ceramic article 14 is adhered to the carrier tape by the radiation curable adhesive layer 13.

Both of the adhesive layers 13 and 16 are heat stable. Upon exposure to elevated temperatures such as those ordinarily encountered during the processing of green ceramic materials such as ceramic capacitor materials, the adhesive layers 13 and 16 retain their adhesive characteristics. By way of example, the adhesive layers 13 and 16 will maintain adhesive characteristics after exposure to elevated temperature of at least 66° C. for 96 hours. Preferably, the adhesive layers 13 and 16 have a heat-aged peel strength after exposure to elevated temperature 66° C. for 96 hours of at least 10 grams per centimeter. Heat-aged peel strength can be determined by ASTM standard test method ASTM D 1151-84, Method D903-49.

A preferred class of adhesives for use in the adhesive layers 13 and 16 are acrylic pressure sensitive adhesives. A wide range of pressure sensitive acrylic adhesive compositions is available commercially, and with the disclosure contained herein those of ordinary skill in the art could select any of a number of commercially available adhesive formulations to achieve the purposes of the present invention. Typically, pressure sensitive acrylic adhesive compositions useful as the adhesive layers 13, 16 will contain one or more thermoplastic acrylic polymers, such as polymethyl methacrylate or polyethyl methacrylate. Additionally, the adhesive composition will contain one or more multifunctional acrylic monomers. Monomers such as diethylene glycol diacrylate, neopentyl glycol diacrylate, tripropylene glycol diacrylate, trimethylolpropane diacrylate, pentaerythritol triacrylate, propoxylated glycerol triacrylate, and a combination of these di- and multifunctional reactive components can be used in the adhesive system.

The adhesive composition for the adhesive layer 13 is formulated so that it is radiation curable. While the adhesive will maintain its adhesive properties upon exposure to elevated temperature, exposure to an actinic radiation source such as ultraviolet light or electron beam radiation will deactivate the adhesive, causing it to cure or cross-link and lose its adhesive characteristics. For a UV curable adhesive, a photoinitiator is added to the composition in an amount effective to respond to the UV radiation and to initiate curing of the associated resin, via substantial polymerization thereof.

Suitable photoinitiators useful with ultraviolet (UV) actinic radiation curing mono- and polyolefinic monomers include free radical generating UV initiators such as benzophenone and substituted benzophenones, acetophenone and substituted acetophenones, benzoin and its alkyl ethers and xanthone and substituted xanthones. Examples of commercially available UV photoinitiators include Irgacure® 500, an eutectic compound of 1-hydroxycyclohexyl phenyl ketone (Irgacure® 184) and benzophenone, and other photoinitiators of the Irgacure® type available from the company Ciba-Geigy such as Darocur® 1173.

In addition, the adhesive composition may include particulate fillers, such as polyethylene powder, silica, and pigments such as titanium dioxide. In particular, the radiation curable adhesive layer 13 preferably contains a dispersion of finely divided particles which serve for scattering light applied to the tape 10 and for moderating the tack (i.e. degree adhesiveness) between the substrate 11 and the opaque green ceramic article 14.

An exemplary formulation for the UV curable adhesive layer 13 is as follows: 50 parts by weight polymethyl methacrylate (Rohm & Haas Acryloid® A11); 40 parts by weight dipentaerythritol pentaacrylate (Sartomer 399); 2.2 parts by weight photoinitiator (a 50/50 blend of 1-hydroxycyclohexyl phenyl ketone and benzophenone (IRGACURE 500) and 2-hydroxy-2-methyl-1-phenyl-propan-1-one available from Ciba-Geigy as Darocur 1173; 0.2 parts by weight polyolefin powder (Shamrock 5384); 5 parts by weight titanium dioxide dispersion in an acrylic binder (Shamrock ST35); and about 0.04 parts by weight silica filler (Aerosil® R972 from DeGussa).

FIG. 1 shows how the adhesive tape of the present invention can be used with a rigid carrier 15, such as a metal sheet, which forms a rigid foundation for applying and laying up multiple layers of green ceramic insulator material as previously described. The tape 10 of the invention is adhered to the carrier 15 by the adhesive layer 16. The adhesive layer 16 can be the same or different from the adhesive layer 13 depending upon the necessary circumstances. For example, if a pressure sensitive adhesive is desired, a combination of the "Gelva" 1151 adhesive from Monsanto cured with PAPI 2027 (an isocyanate from Mobay) is appropriate. If an ultraviolet curable adhesive is desired for the layer 16, its composition can be the same as the adhesive layer 13. Typically, the adhesive layer is slightly thicker if a pressure sensitive formulation is used than if a UV curable formulation is used.

As FIG. 1 schematically illustrates, the adhesive layer 13 can be cured and its adhesive properties deactivated by exposing the assembled layered structure to ultraviolet radiation. As shown, the green ceramic layer 14 (as well as any additional ceramic and conductive layers (not shown) which may be used to form the ceramic article) has an area which is somewhat smaller than the tape 10. The ceramic article is thus positioned on the tape with marginal edges of the tape protruding beyond the perimeter of the ceramic article. When ultraviolet radiation is directed onto the structure from the front side thereof, the protruding portions of the tape that extend outwardly beyond the opaque green ceramic layer 14 serve to all the light to travel laterally beneath the ceramic article to effect curing of the adhesive. The reflective layer 12 efficiently reflects the light that reaches it, while particles contained in the adhesive help scatter the light within the adhesive layer 13.

In an alternative embodiment, the reflective metallized layer can be located on the opposite side of the substrate 11, with the adhesive layer 16 being applied to the metallized coating. In this embodiment, light can travel laterally through both the adhesive layer 13 and through the film substrate 11.

Figure 2:
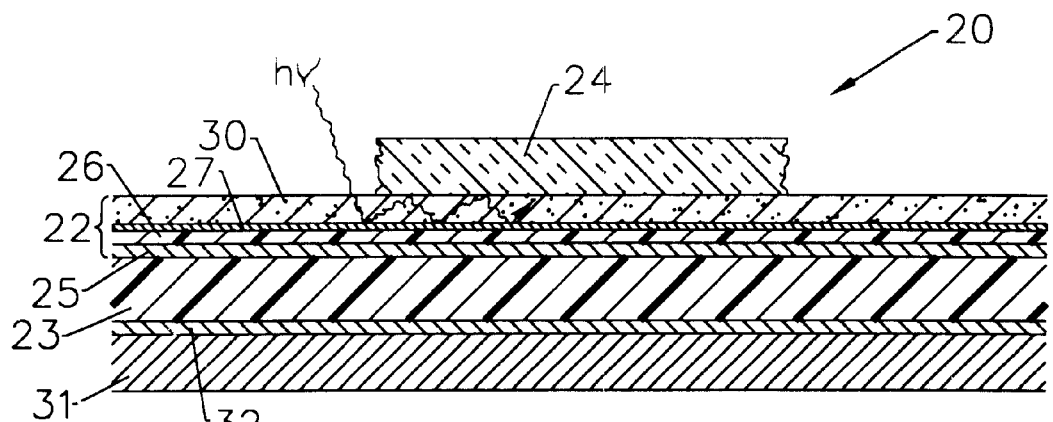
FIG. 2 is a cross-sectional view of a second embodiment of a tape in accordance with the invention.

FIG. 2 illustrates a second embodiment of the invention broadly designated at 20. As in the first embodiment, the tape 20 includes a polyester film substrate 23. A release structure 22 is adhered to the substrate 23. The release structure 22 comprises four elements: a pressure sensitive adhesive layer 25 immediately adjacent the polyester film substrate 23; a thin (typically 1 mil) polyester sublayer 26 held by the adhesive 25 to the thicker (about 7 mils) polyester substrate 23; a reflective layer 27 which may be formed by a foil layer or by metallizing the polyester layer 26 in the manner described earlier; and a UV curable adhesive layer 30 which can be adhered to the green ceramic layer 24. As noted above, metallized polyester sublayer 26 is in turn held to the polyester substrate 23 by the pressure sensitive adhesive 25. The composition and function of these layers are the same as described with respect to the embodiment illustrated in FIG. 1, with FIG. 2 providing a structure that gives the desired reflective characteristics, but without metallizing the polyester substrate 23. The tape 20 may be applied to a rigid carrier 31, such as a metal sheet, by the pressure sensitive or UV curable adhesive 32.

Figure 3:
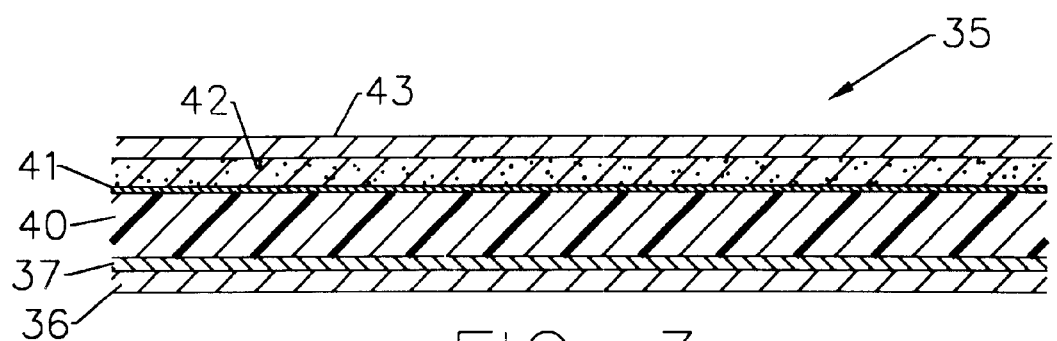
FIG. 3 is a cross-sectional view of a third embodiment of a tape in accordance with the invention.

In FIG. 3 a radiation curable adhesive tape is broadly designated at 35 and corresponds generally to the tape 10 in FIG. 1, except that removable release liners are provided covering the two adhesive layers. More specifically, the tape 35 illustrated FIG. 3 includes a release liner 36, a pressure sensitive adhesive 37 on the release liner 36, a polyester substrate 40 with its metallization layer 41, the UV curable adhesive 42, and a second release liner 43. The release liners 36 and 43 may be formed of either a coated paper or a polymer film, such as polyester. The release liners typically include a release coating, typically a silicon-based composition, providing release properties so that the release layer can be removed to expose the underlying adhesive layer. In use, the release layers 36 and 43 are left in place to facilitate shipment, storage and handling, and are removed at the time of use to expose the adhesive layers so that a green ceramic layer (such as layer 14 in FIG. 1 or layer 24 in FIG. 2) can be applied to the UV curable adhesive 42 and so that a carrier layer such as the sheet 15 in FIG. 1 or the sheet 31 in FIG. 2, can serve as the base for a layered structure of multiple layers of green ceramic tape.

In another embodiment of the invention, a structure similar to that shown in FIGS. 1, 2 or 3 is used, except that the reflective layer (12, 26, 41) is omitted. The tape is thus substantially transparent t UV radiation. When the manufacturing steps, e.g laminating, dicing, etc., are completed, the tape may be stripped from the rigid metal carrier with the completed ceramic articles adhered thereto. Then, the tape may be exposed to UV radiation through the rear the film to deactivate the adhesive properties of the adhesive layer holding the ceramic articles to the tape, and thereby releasing the ceramic articles.

In the drawings and specification, there have been disclosed typically preferred embodiments of the invention and, although specific terms have been employed, they have been used in a generic sense and descriptive sense only, and not for purposes of limitation, the scope of the invention being set forth in the following claims.

That which is claimed:

1. An adhesive tape comprising:
   a substrate;
   a reflective layer on one surface of said substrate;
   a first adhesive layer on one side of said substrate, said first adhesive layer comprising a heat stable adhesive composition; and
   a second adhesive layer on the opposite side of said substrate, said second adhesive layer comprising a heat stable, radiation curable adhesive composition which loses its adhesive characteristics upon exposure to radiation.

2. A tape according to claim 1, wherein said first adhesive layer comprising a heat stable adhesive composition which maintains adhesive characteristics at elevated temperatures of at least 66° C. for 96 hours.

3. A tape according to claim 1, wherein said second adhesive layer comprises a heat stable adhesive composition which maintains adhesive characteristics at elevated temperatures of at least 66° C. for 96 hours, but loses its adhesive characteristics upon exposure to radiation.

4. A tape according to claim 1, wherein said first and second adhesive compositions have a heat-aged peel strength after exposure to elevated temperature of 66° C. for 96 hours of at least 10 gm/cm.

5. A tape according to claim 1, wherein said substrate comprises a heat stable polymer film and said reflective layer comprises a metallized coating on at least one surface of said heat stable polymer film.

6. A tape according to claim 5, wherein said heat stable polymer film comprises a polyester film, and said metallized coating is located on the surface of said film adjacent said second adhesive layer.

7. A tape according to claim 1, wherein said second adhesive layer comprises a ultraviolet radiation-curable pressure sensitive adhesive composition.

8. A tape according to claim 1, wherein said first adhesive layer also comprises a heat stable, radiation curable adhesive composition which loses its adhesive characteristics upon exposure to radiation.

9. A tape according to claim 1, wherein said second adhesive composition has particles dispersed therein for dispersing and scattering radiation throughout said second adhesive layer.

10. A tape according to claim 1, additionally including a protective release liner removably adhered to the surface of said second adhesive layer.

11. An adhesive tape comprising:
    a heat stable polyester film substrate having a reflective metallized coating on one surface thereof;
    a first adhesive layer on one surface of said polymer film substrate, said first adhesive layer comprising a heat stable, pressure sensitive acrylic adhesive composition; and
    a second adhesive layer on the opposite surface of said polymer film substrate, said second adhesive layer comprising a heat stable, radiation curable acrylic pressure sensitive adhesive composition in which the pressure sensitive adhesive characteristics are deactivated upon exposure to radiation and curing of said adhesive composition.

12. A tape according to claim 11, wherein said second adhesive composition has a peel strength in the uncured state of at least 10 g/cm and in the radiation cured state of substantially zero.

13. A tape according to claim 12, wherein said first and second adhesive compositions have a heat-aged peel strength after exposure to an elevated temperature of 66° C. for 96 hours of at least 10 g/cm.

14. A tape according to claim 11, wherein said heat stable, radiation curable acrylic pressure sensitive adhesive composition of said second adhesive layer comprises a multifunctional acrylate monomer or oligomer, a UV photoinitiator, and a particulate filler.

15. A tape according to claim 11, wherein said first adhesive layer is located on the surface of said polymer film substrate opposite said metallized coating layer, and said second adhesive layer is adhered to said metallized coating layer.

16. An adhesive tape comprising:

a heat stable polyester film substrate;

a first adhesive layer on one side of said polymer film substrate, said first adhesive layer comprising a heat stable, pressure sensitive acrylic adhesive composition;

a protective release layer removably adhered to said first adhesive layer;

a second adhesive layer on the opposite side of said polymer film substrate, said second adhesive layer comprising a heat stable, radiation curable acrylic pressure sensitive adhesive composition in which the pressure sensitive adhesive characteristics are deactivated upon exposure to radiation and curing of said adhesive composition; and a protective release layer removably adhered to said second adhesive layer.

17. A structure useful for producing a ceramic article, comprising: a rigid sheet; an adhesive tape adhered to said rigid sheet; and a green ceramic article adhered to said tape; said tape comprising:

a substrate;

a reflective layer on one surface of said substrate;

a first adhesive layer on one side of said polymer film substrate adhering the polymer film substrate to said rigid sheet, said first adhesive layer comprising a heat stable adhesive composition; and a second adhesive layer on the opposite side of said polymer film substrate adhering the polymer film substrate to said ceramic article, said second adhesive layer comprising a heat stable, radiation curable adhesive composition.

18. A structure according to claim 17, wherein said substrate comprises a heat stable polymer film and wherein said reflective layer comprises a metallic coating.

19. A structure according to claim 18, wherein said heat stable polymer film comprises a polyester film, and said metallized coating is located on the surface of said film adjacent said second adhesive layer.

20. A structure according to claim 17, wherein said second adhesive layer comprises an ultraviolet radiation-curable adhesive composition.

21. A structure useful for producing a ceramic article, comprising: a rigid sheet; an adhesive tape adhered to said rigid sheet; and a green ceramic article adhered to said tape; said tape comprising:

a heat stable polyester film substrate having a reflective metallized coating on one surface thereof;

a first adhesive layer on one surface of said polymer film substrate adhering the polymer film substrate to said rigid sheet, said first adhesive layer comprising a heat stable, pressure sensitive acrylic adhesive composition; and a second adhesive layer on the opposite surface of said polymer film substrate adhering the polymer film substrate to said green ceramic article, said second adhesive layer comprising a heat stable, radiation curable acrylic pressure sensitive adhesive composition in which the pressure sensitive characteristics are deactivated upon exposure to radiation and curing of said adhesive.

22. A method of using an adhesive tape in the manufacture of a ceramic article, said tape including a substrate; a heat stable first adhesive layer on one surface of the substrate; and a heat stable, radiation curable second adhesive layer on the opposite surface of the substrate, said method comprising:

adhering the adhesive tape to a rigid surface with said first adhesive layer;

adhering a green ceramic article to said second adhesive layer;

applying heat and pressure to the thus adhered green ceramic article to laminate the ceramic article;

exposing the tape to radiation to cure the radiation curable second adhesive layer and deactivate its adhesive properties;

removing the laminated green ceramic article from the tape; and stripping the tape from said rigid surface.

23. A method according to claim 22, wherein said step of adhering a green ceramic article to the tape comprises positioning the green ceramic article on the tape with marginal edges of the tape protruding beyond the perimeter of the ceramic article, and said step of exposing the tape to radiation comprises exposing said protruding marginal edges of the tape to radiation.

* * * * *

UNITED STATES PATENT AND TRADEMARK OFFICE
CERTIFICATE OF CORRECTION

PATENT NO. : 6,174,578 B1
DATED : January 16, 2001
INVENTOR(S) : Holley

Page 1 of 1

It is certified that error appears in the above-identified patent and that said Letters Patent is hereby corrected as shown below:

Column 6,
Line 23, "claim 5" should read -- claim 1 --.

Signed and Sealed this

Sixth Day of November, 2001

Attest:

*Attesting Officer*

NICHOLAS P. GODICI
*Acting Director of the United States Patent and Trademark Office*